United States Patent [19]

Stocchiero

[11] Patent Number: 5,080,248
[45] Date of Patent: Jan. 14, 1992

[54] CONTAINER LID WITH SEALING DEVICE

[76] Inventor: Olimpio Stocchiero, 5 Via Kennedy, 36050 Montorso Vicentino (VI), Italy

[21] Appl. No.: 644,518

[22] Filed: Jan. 23, 1991

[30] Foreign Application Priority Data

Jan. 25, 1990 [IT] Italy .................. 85512 A/90

[51] Int. Cl.$^5$ .............................. B65D 53/00
[52] U.S. Cl. ........................ 220/232; 220/233; 220/234
[58] Field of Search .......... 220/232, 233, 234, 239, 220/287, 358, 378, 306

[56] References Cited

U.S. PATENT DOCUMENTS

| 2,371,586 | 3/1945 | Schwartz. | |
| 2,559,564 | 7/1951 | Sperling | 220/232 |
| 2,785,824 | 3/1957 | Reeves | 220/232 |
| 3,178,779 | 4/1965 | Clark et al. | 220/232 X |
| 3,240,038 | 3/1966 | Schwegler | 220/232 X |
| 3,352,446 | 11/1967 | Anderson et al. | 220/232 |
| 4,114,668 | 9/1978 | Hickey | 220/232 |
| 4,121,732 | 10/1978 | Hickey | 220/232 |
| 4,306,665 | 12/1981 | Hickey | 220/232 |
| 4,335,075 | 6/1982 | Kackos | 220/232 X |
| 4,480,424 | 11/1984 | Seldon | 220/232 X |
| 4,809,864 | 3/1989 | Neuthard et al. | 220/232 X |

FOREIGN PATENT DOCUMENTS 1310018 10/1962 France.

Primary Examiner—Stephen Marcus
Assistant Examiner—Vanessa Caretto
Attorney, Agent, or Firm—Birch, Stewart, Kolasch & Birch

[57] ABSTRACT

A lid with a sealing device for containers includes a horizontal top (2; 50; 62), at least one air tube (6;51;63;73;83) attached to the lid (1;50;60;71;81), one or more suction cups (8;55;67;75;74;85;84) attached to the air tube and a hole (9;53;77;87) made in the lid and communicating with each air tube. Each suction cup accomplishes its sealing action between the lid and the container on which the lid is applied when the air tube to which each suction cup is attached is expanded by a compressed fluid, thereby causing the suction cups to adhere against the edge of the container and/or the lid applied on the container itself.

10 Claims, 2 Drawing Sheets

CONTAINER LID WITH SEALING DEVICE

BACKGROUND OF THE INVENTION

The invention concerns a container lid with a sealing device. It is known that, in order to protect substances held within containers, the containers are closed by lids which seal in the area where the container and the lid match.

Thus, for instance, containers for industrial use, which are commonly called barrels and are meant to contain especially lubricating oils, hydrocarbon liquids, acids and the like, are closed by lids having a shaped annular ridge, through which they are solidly riveted into the upper rim of the barrel. Such lids achieve an air- and water-tight seal, but present the inconvenience that, once the barrel has been emptied, it cannot be re-used. In fact, in order to re-use it, it is necessary to clean its inside, after the lid has been removed by cutting off the annular rim which attaches it to the barrel. This operation deforms the rim of the barrel which then becomes unsuited to receive other lids and, therefore, cannot be re-used. The barrel can be used at best as a generic container, but it presents the inconvenience that, due to the deformed rim, it can also be dangerous, particularly if the barrel is made of metal.

If the barrel is meant to contain substances in grain or powder form, such as, dyes, bonding agents and, substances which do not require an absolutely tight seal, lids are used which present one or more perimetral rims which, when pressed, snap because of elastic deformation into matching rims of the barrel. In this case, since the lid can easily be applied and removed, it offers the advantage of making it possible to re-use the barrel, since it is easy to reach its interior for cleaning purposes without damaging the rim of the container on which the lid is applied. The inconvenience presented by this type of lids is that they do not hermetically close the container.

In the special branch of the manufacture of lead-acid storage batteries, it is a known fact that the lids sealing the containers which hold the elements of the battery must perform two important tasks.

The first task is to guarantee the tight sealing of the container thereby preventing the spilling out of the electrolyte contained therein, which, considering its high degree of corrosive power, may cause considerable damage.

A second but not by any means minor tasks is that they must allow for the lengthening of the poles, particularly of the positive pole which, because of electrochemical phenomena, becomes longer during the life span of the battery. Thus the poles are prevented from pressing against the lid, while the tight sealing of the lid itself is safeguarded.

As far as tightness is concerned, it is guaranteed either by sealing the lid to the container holding the poles of the accumulator battery by means of bonding agents, or by creating rims on the lid and the container, which rims come into mutual contact through special profiles matching each other.

On the other hand, as far as the extension of the poles is concerned, it is allowed for by using bonding agents with a very high yield point or by suitably shaping the surface of the lid, or by shaping the seats of the poles to make them elastic and deformable.

These known methods, while being praise worthy for solving both the problem of the hermetic seal and that of the lengthening of the poles, present some inconveniences.

Concerning the method of obtaining the hermetic seal through the use of bonding agents with a high yield point, it presents the inconvenience that, when it becomes necessary to remove the lid in order to perform maintenance operations on the accumulator battery, the removal is difficult. In fact, it is necessary to remove the bonding seam, which often leads to damage to the container lid. The method which uses specially shaped matching rims between the lids and the containers, presents the inconveniences that lids and containers are not interchangeable, and that costly and complex moulds are necessary to manufacture them.

Concerning the method of deformable lids and pole seats, the manufacture of lids with surfaces having special shapes requires the use of complex moulds, and does not solve the problem in lids having a limited width in comparison with their length, since such lids present an insufficient degree of elasticity. In addition, the production of elastic and deformable seats for the poles is not cost-efficient because of the expense involved in the moulds necessary for such production.

SUMMARY OF THE INVENTION

The present invention proposes to overcome the mentioned inconveniences by providing a container lid with a sealing device whose main purpose is that of guaranteeing a stable connection between the lid and the container, while insuring its air and water tightness.

Another purpose of the invention is to provide a lid with a sealing device which, while insuring the water and air tightness, is also elastic and deformable.

Yet another purpose of the invention is to provide a lid with a sealing device, wherein the assembly on and the removal from the container is easier and quicker than lids of the known types.

Not the least purpose of the invention is to provide a lid with a sealing device which can be assembled on containers of any kind, as long as the upper edge of the container presents a flat and smooth surface.

The above-mentioned purposes and others which will be better described hereafter are reached by a container lid with a sealing device, characterized in that it comprises:
 a horizontal top with an annular rim;
 at least an air tube attached to the lid through connecting means;
 one or more suction cups connected with the air tube and cooperating with the edge of the container on which the lid is applied and/or with the lid itself;
 a hole, obtained in the lid and communicating with each air tube,
wherein each suction cup provides the sealing action between the lid and the container on which the former is applied, when the air tube with which each suction cup is connected is expanded by means of a compressed liquid and presses each of said suction cups against the edge of the container and/or of the lid, thereby causing them to adhere to it or to them.

According to a preferred embodiment of the invention, the lid with a sealing device has its annular rim arranged within the perimeter of its horizontal top.

According to another embodiment of the invention, the lid with a sealing device has its annular rim arranged along the perimeter of its horizontal top.

In both of these embodiments of the lid, the air tube of the sealing device can be connected with the lid itself according to three preferred embodiments.

A first embodiment thereof foresees the connection of the air tube to the lid by gluing it to the annular rim of the lid.

Another embodiment thereof foresees the connection of the air tube to the lid through a projection belonging to the air tube which, when pressed, penetrates into a corresponding indentation obtained within the annular rim of the lid.

Yet another embodiment thereof foresees the connection of the air tube to the lid through a suction cup, also belonging to the air tube and attached to it on the opposite side of the suction cup which is connected with the edge of the container or is attached at 90 degrees in relation to this sealing suction cup. In this case the connecting suction cup also acts as a sealing agent.

Advantageously according to the invention, a lid with a sealing device is disclosed which, when it is applied on barrels for liquid or solid materials of any kind, always permits the hermetic sealing of the same, while guaranteeing an easy assembly and removal of the lid itself. Moreover, the lid can be removed from the container without damaging the junction rims and easily permitting cleaning of the container and as easy and economical re-use of both the container and the lid.

Moreover, the lid with a sealing device according to the invention allows for the lengthening of the poles when applied to the known-type containers of electric accumulator batteries, thanks to its elasticity. It also simplifies the maintenance operations on the poles and the plates of the battery because of its easy assembly and removal. Furthermore, the danger of damaging either the container or the lid is eliminated, which danger exists when using lids of the known type which are either welded or glued to the container.

BRIEF DESCRIPTION OF THE DRAWINGS

Further scope of applicability of the present invention will become apparent from the detailed description given hereinafter. However, it should be understood that the detailed description and the specific examples, while indicating preferred embodiments of the invention, are given by way of illustration only, since various changes and modifications within the spirit and scope of the invention will become apparent to those skilled in the art from this detailed description and from the drawings, wherein.

DESCRIPTION OF THE PREFERRED EMBODIMENTS

Figure 1:
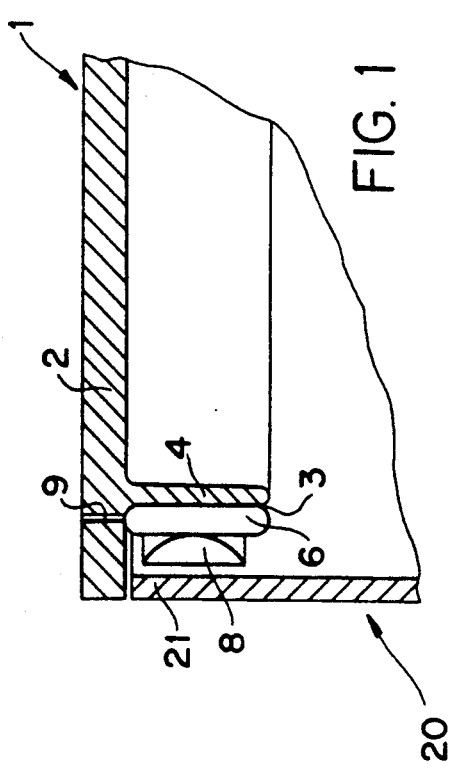
FIG. 1 shows the lid with a sealing device of the invention applied on a container and not in its sealing position, in the embodiment wherein the annular rim is arranged within the perimeter of its horizontal top and the air tube is glued to the lid along its annular rim.

The lid with a sealing device according to the invention is represented in FIG. 1 where it is indicated as a whole with reference numeral 1. It can be observed that the lid and sealing device comprises a horizontal top 2 having an annular rim 4 arranged within the perimeter of the lid. The outside of the rim is attached the sealing device comprising an air tube 6 having a toroidal shape to which, in turn, a suction cup 8 is attached. The suction cup 8 is connected along the entire outer perimeter of the air tube 6. Therefore, the suction cup 8 also aquires an annular configuration, completely surrounding the toroidal air tube 6.

It will be pointed out, however, that the air tube can have a shape differing from the toroidal configuration and that it can also be made in sections. The sections can be separate or connected to one another, and, at any rate, arranged next to each other in succession, each being attached to the annular rim 4 of the lid. Similarly, the suction cup, instead of having an uninterrupted annular configuration, can also be made in connected or separate sections, each being attached to its respective air tube.

The air tube 6 adheres to the annular rim 4 through a bonding seam 3, and communicates with the outside environment through a hole 9 which is bored in the horizontal top 2 of the lid.

In FIG. 1, the lid of the invention covers a container 20, and it can be observed that the annular rim 4 of the lid is placed within the container 20 with the suction cup facing the inner wall of the upper edge 21 of the container itself.

Figure 3:
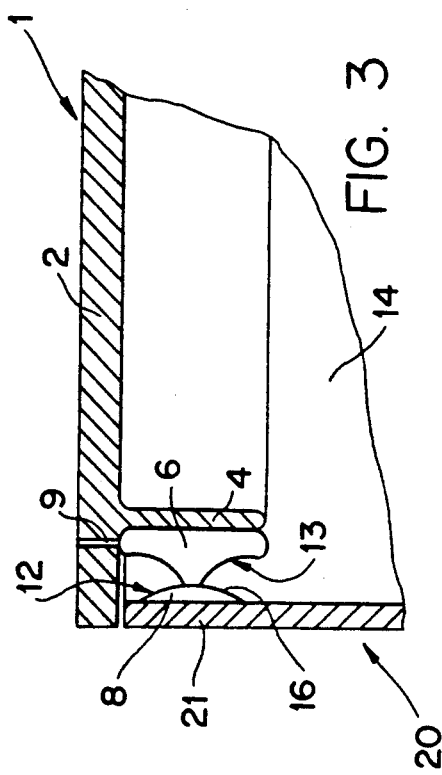
FIG. 3 shows the lid of FIG. 2 with the suction cup in its sealing position against the edge of the container, after the air tube has been inflated.
Figure 2:
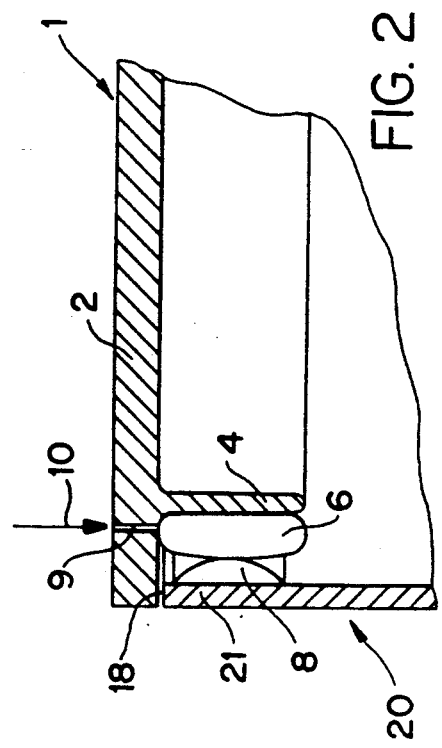
FIG. 2 shows the lid of FIG. 1 while the air tube is being inflated.

The connection of the lid 1 with the upper edge 21 of the container 20 occurs, as can be observed in FIG. 2, when air is blown through hole 9 as shown by arrow 40 into the air tube 6. When the air tube is inflated, it radially pushes the suction cup, which, is then pressed against the inner surface of edge 21 of container 20. The suction cup remains attached to the inner surface of edge because of the atomspheric pressure acting on the outer surface 12 of the suction cup 8, as can be observed in FIG. 3.

In this situation lid 1 is securely bound to container 20 and the seal between edge 21 and the lid is hermetic. It can be observed, in fact, that the outer surface 16 of the suction cup 8 and the outer surface 13 of the air tube 6, both of which are turned toward the interior of the container 20, do not present any point of discontinuity along the perimeter of the annular rim 4, so that any material contained within container 20 may not spill out, nor can any external material enter.

Figure 4:
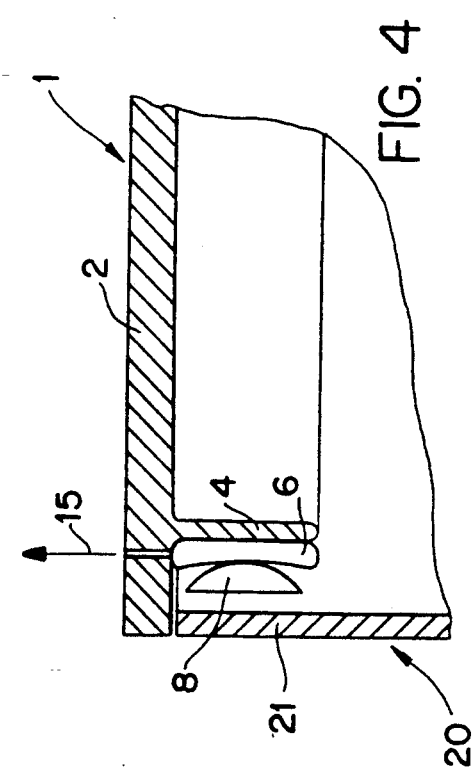
FIG. 4 shows the lid of the invention of FIG. 3 while the air tube is being deflated and the suction cup comes off the container.

If one desires to remove lid 1, it is sufficient, as can be observed in FIG. 4, to expel the air from the air tube 6 in the direction indicated by arrow 15, so as to create a depression which radially withdraws the suction cup 8 and detaches it from edge 21 of container 20. Lid 1 is thus free and can easily be removed.

It will, therefore, be noticed that the purpose has been fulfilled of providing a lid, which, besides offering a hermetic seal of the container, can also be easily applied and easily removed. When the lid is applied on normal containers holding liquids or solids, it offers the advantage that the barrel can be washed and re-used. On the other hand, if the lid is applied on containers for lead-acid storage batteries, its use permits the container to be closed easily and to be opened in order to allow maintenance operations on the plates and the poles, without the danger of damaging either the edge of the container or the rim of the lid.

By observing FIG. 2, it can be noticed that when the lid is connected with container 20 and the suction cup is in its sealing position, between lid 1 and edge 21 of container 20 there remains a hollow space 18 which permits the vertical displacement of lid 1 in relation to container 20 without compromising the sealing action of the suction cup, thanks to the elasticity of the suction cup and of the air tube at their junction point. This possibility of the lid to vertically slide in relation to the container permits stacking of the material-holding barrels when the lid is applied on said barrels. In fact, when a barrel is stacked on another, lid 1 sinks vertically until the inner surface of its top rests against the upper part of edge 21 of container 20. In this case the weight of the upper barrel is not supported by the horizontal top 2 of the lid, but rather by the lateral walls of container 20 and this yields an improved structural safety of the containers and of the sealing action of the suction cup, which is not compromised.

Figure 5:
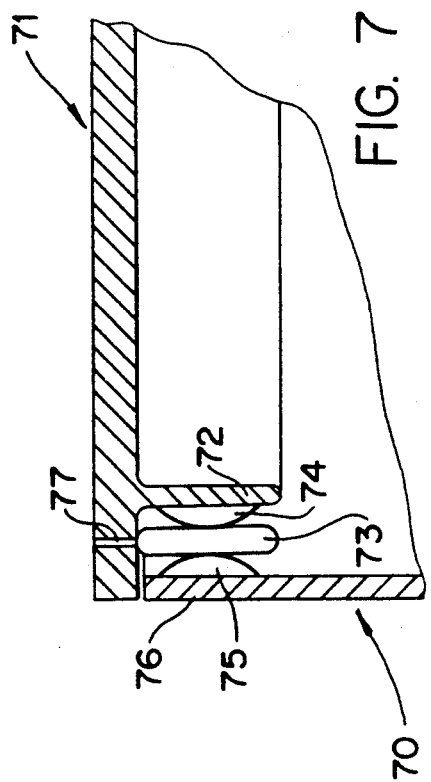
FIG. 5 shows the lid of the invention with the suction cup in its sealing position against the container in the embodiment wherein the annular rim is arranged along the perimeter of its horizontal top and the air tube is glued to the lid along its annular rim.

This possibility of the lid to vertically slide in relation to the container also becomes very useful when the lid 1 according to the invention is applied on containers for lead-acid accumulator batteries, wherein the ability of the lid to slide vertically permits compensation for the lengthening of the poles. FIG. 5 shows an embodiment of the lid with the sealing device according to the invention, wherein the annular rim 52 of lid 50 is positioned along the perimeter of the horizontal top 59 of lid 50. In this embodiment the toroidal air tube 51 is applied, again through a bonding seam 58, on the inner wall of rim 52 of the lid. When lid 50 is placed on container 57, the air tube 51 and the suction cup 55 which is attached to it arrange themselves along the outer edge 56 of container 57, so that, when air is blown into the air tube 51 through hole 53, the suction cup 55 which is connected to the air tube is forced radially against the outer edge 56 of container 57, thereby guaranteeing an hermetic seal.

Figure 6:
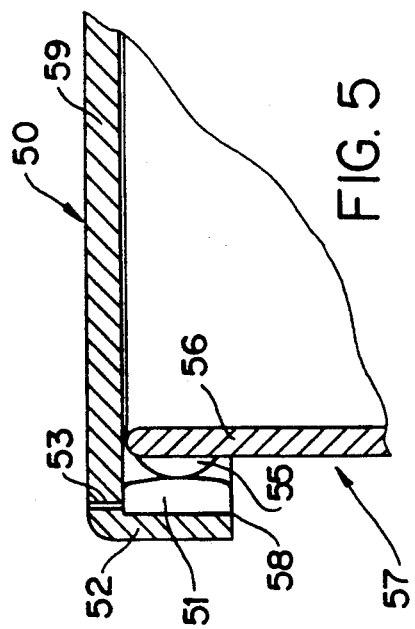
FIG. 6 shows the lid of FIG. 1 in the embodiment wherein the air tube is applied along the annular rim of the lid by a pressure inserted projection.

This embodiment also fulfills all the proposed purposes of the lid according to the invention, as has been previously described. Both of the just-described embodiments of the lid according to the invention can also be made according to a variation which foresees the connection between the air tube and the annular rim of the lid through a pressure inserted projection, rather than through gluing. This variation is represented in FIG. 6 and is applied to the embodiment wherein lid 60 has an annular rim 61 arranged within the perimeter of the top 62 of the lid 60. In this embodiment, the air tube 63 with the suction cup 67 has a peg 65 which, when pressed, penetrates into a corresponding indentation 66 in the rim 61 of the lid and guarantees the stable connection between the two.

Figure 7:
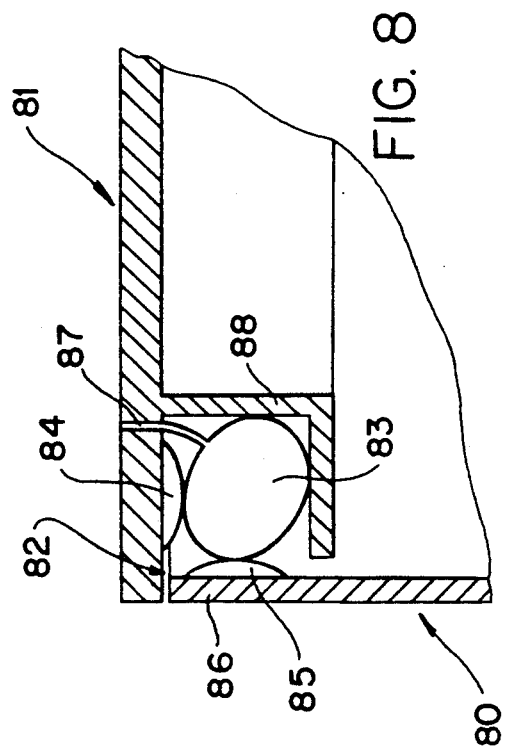
FIG. 7 shows the lid of FIG. 1 in another embodiment wherein the air tube is attached to the lid through a suction cup adhering to the annular rim of the lid itself.

Yet another variation is possible concerning the connection between the air tube and the lid, as shown in FIG. 7 by providing the air tube 73 with a secondary suction cup 74 connected with the air tube 73. The secondary suction cup is an integral part air tube 73 and is positioned on the opposite side in relation to the suction cup 75, which seals the outer edge 76 of container 70. The connection of the air tube 73 with the rim 72 of lid 71 occurs because of the suction cup 74 adhering to rim 72 of the lid when the air tube 73 is inflated by blowing air into it through hole 77. In this case the suction cup 74 not only connects the air tube 73 with the rim of the lid, but also acts as a sealing element on the edge of the container, as does the suction cup 75.

Figure 8:
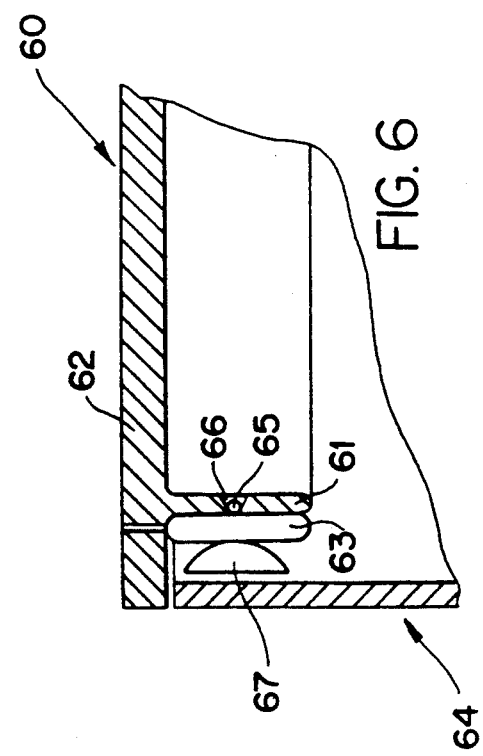
FIG. 8 shows the lid of the invention in yet another embodiment wherein the air tube is attached to the lid through a suction cup adhering to the underside of the horizontal top of the lid.

Yet another variation concerning the connection of the air tube to the lid is represented in FIG. 8, where it can be observed that the air tube 83 has a secondary suction cup 84 connecting it to the lid 81. Secondary suction cup 84 is arranged at 90 degrees in relation to suction cup 85 which acts as a seal on the outer edge 86 of container 80. The connection of the air tube 83 with lid 81 occurs because the suction cup 84 adheres to the lower surface of the horizontal top of the lid 81 when air is blown into the air tube 83 through hole 87. In this case, too, the suction cup 84, besides connecting the air tube with the lid, also acts as a sealing agent, as does the suction cup 85.

By observing FIG. 8 it can be noticed that in this embodiment, the annular rim 88 of lid 81 presents an L-shaped profile which lodges and supports the air tube 83.

The described variations concerning the connection between the air tube and the lid can also be applied to the embodiment of the lid wherein its annular rim is arranged along the outer perimeter of its horizontal top. All the described variations concerning the connection between the air tube and the different embodiments of the lid fulfill all the proposed purposes which have previously been described.

First of all, the purpose of obtaining a lid guaranteeing an hermetic seal, together with the possibility of being easily assembled and removed, has been reached. This yields the double advantage of a safety against the spilling of the product outside the container and against the penetration of external materials into the container, together with the possibility of easily removing the lid without damaging either the container or the lid. When the lid is applied to normal barrels meant to hold liquid or solid materials, this feature yields the possibility of re-using the container, which can easily be opened by removing the lid. On the other hand, when the lid is applied on containers holding the elements of lead-acid storage batteries, it presents the advantage of simplifying the maintenance operations on the poles and on the plates by removing the lid itself, without any danger of damaging either the container or the lid.

It has also been shown that the lid of the invention can slide vertically in relation to the container, while still preserving intact its sealing action. When the lid is applied on common containers, such as barrels meant to hold liquid or solid materials, this feature permits stacking of the barrels on each other, thanks to the capacity of the lid to vertically slide in relation to the container. On the other hand, when the lid according to the invention is applied on lead-acid storage batteries, this possibility of sliding vertically allows for the lengthening of the poles, thereby avoiding stresses on the lid.

During the manufacturing process the elements constituting the lid may undergo various modifications concerning their shape or their dimensions.

For instance, the air tubes may be more than one in number and each of them can be made in sections, separated from each other. This modification may be useful if one of the air tubes is perforated, the hermetic seal may fail, but the mechanic seal between the lid and the container will not fail completely.

In the same way the suction cups can also be more than one in number, each connected with its respective air tube. In any case it is understood that all the possible variations and modifications are still to be considered within the scope of the present invention.

I claim:

1. A lid with a sealing device for containers comprising:
    a lid having a horizontal top, a perimeter and an annular rim;
    a container having an edge on which said lid is applied;
    at least one air tube attached to said lid through connecting means;
    one or more sealing suction cups connected with said at least one air tube and cooperating with said edge of said container on which said lid is applied and/or with said lid itself; and
    a hole made in said lid, said hole being in communication with each of said at least one air tube,
    wherein each sealing suction cup acts as a sealing element between said lid and said container on which said lid is applied when said air tube, with which each of said sealing suction cups is connected, is inflated by a compressed fluid and presses said sealing suction cups into contact with said edge of said container and/or into contact with said lid.

2. The lid with a sealing device for containers of claim 1, wherein said annular rim of said lid is arranged within said perimeter of said horizontal top of said lid itself.

3. The lid with a sealing device for containers of claim 1; wherein said annular rim of said lid is arranged around said perimeter of said horizontal top of said lid itself.

4. The lid with a sealing device for containers according to claim 1, wherein said at least one air tube is connected with said lid through a gluing agent along said annular rim of said lid.

5. The lid with a sealing device for containers of any one of claims 1 to 3, wherein said at least one air tube is connected with said lid through a projection belonging to said at least one air tube, said projection penetrating under pressure into a corresponding indentation obtained in said annular rim of said lid.

6. The lid with a sealing device for containers of any one of claims 1 to 3, wherein said at least one air tube is connected with said lid through at least one secondary suction cup belonging to said at least one air tube itself.

7. The lid with a sealing device for containers of claim 6, wherein said at least one secondary suction cup connecting said air tube with said lid is attached to said air tube itself on a side opposite a point where said at least one sealing suction cup is attached.

8. The lid with a sealing device for containers of claim 6, wherein each of said at least one secondary suction cup connecting said air tube with said lid is positioned on said air tube itself at 90 degrees in relation to said at least one sealing suction cup.

9. The lid with a sealing device for containers of claim 1, wherein each of said at least one air tube has a toroid shape.

10. The lid with a sealing device for containers of claim 1, wherein each of said at least one air tube consists of sections, some of said sections being aligned and eventually separated from each other.

* * * * *